(12) United States Patent
Akutagawa

(10) Patent No.: US 7,006,667 B2
(45) Date of Patent: Feb. 28, 2006

(54) APPARATUS AND METHOD FOR DETECTING ROAD WHITE LINE FOR AUTOMOTIVE VEHICLE

(75) Inventor: Kiyoshi Akutagawa, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 694 days.

(21) Appl. No.: 09/987,258

(22) Filed: Nov. 14, 2001

(65) Prior Publication Data

US 2002/0061123 A1 May 23, 2002

(30) Foreign Application Priority Data

Nov. 22, 2000 (JP) ............................. 2000-356565

(51) Int. Cl.
*G06K 9/00* (2006.01)
(52) U.S. Cl. .................. 382/104; 382/269; 382/199; 348/113; 701/1; 701/300
(58) Field of Classification Search ................ 382/104, 382/199, 200, 255, 260, 263, 266, 275, 277, 382/106, 269, 286; 348/248, 241, 113, 607; 701/200, 1, 300; 340/907, 933; 345/611; 355/55; 396/89
See application file for complete search history.

(56) References Cited

U.S. PATENT DOCUMENTS

| | | | |
|---|---|---|---|
| 4,573,070 A | * | 2/1986 | Cooper ...................... 348/617 |
| 5,097,329 A | * | 3/1992 | Hasegawa et al. .......... 348/171 |
| 5,708,693 A | * | 1/1998 | Aach et al. .................... 378/62 |
| 5,835,614 A | * | 11/1998 | Aoyama et al. ............. 382/104 |
| 5,987,174 A | * | 11/1999 | Nakamura et al. .......... 382/199 |
| 5,991,427 A | | 11/1999 | Kakinami et al. .......... 382/104 |

FOREIGN PATENT DOCUMENTS

| | | |
|---|---|---|
| DE | 199 18 050 | 11/1999 |
| EP | 0 827 127 | 3/1998 |
| EP | 1 035 509 | 9/2000 |
| JP | 9-142208 | 6/1997 |
| JP | 9-190537 | 7/1997 |
| JP | 10-141921 A | 5/1998 |

OTHER PUBLICATIONS

Katsuyuki, "White Line Detecting Device," Patent Abstracts of Japan, Publication No. 09190537, Published Jul. 22, 1997.

Zerubia et al., "Mean Field Annealing for Edge Detection and Image Restoration," Signal Processing V: Theories and Applications, vol. 2, Conf. 5 (Sep. 18, 1990), pp. 837-840.

Kawazoe, "Edge Extraction and Restoration of Noisy Image by Innovation Process in Kalman Filter," Electronics and Communications in Japan, vol. 71, No. 10 (Oct. 1, 1988), pp. 26-33.

*Primary Examiner*—Barry Choobin
(74) *Attorney, Agent, or Firm*—Foley & Lardner LLP

(57) ABSTRACT

In road white line detecting apparatus and method, a CCD camera is installed to photograph a road surface, an edge image is generated from a road surface image photographed and outputted by the CCD camera, edge positions of a smear are detected from a region of the generated edge image which is determined on the basis of a previously detected position of a white line on the road surface, smear edges corresponding to the edge positions of the smear are generated from the generated edge image, and the present position of the white line are detected from the generated edge image from which the smear edges have been eliminated.

11 Claims, 5 Drawing Sheets

U.S. PATENT DOCUMENTS

| | | | |
|---|---|---|---|
| 6,205,234 B1 * | 3/2001 | Kakinami et al. | 382/104 |
| 6,466,684 B1 * | 10/2002 | Sasaki et al. | 382/104 |
| 6,489,938 B1 * | 12/2002 | Ito | 345/63 |
| 6,546,118 B1 * | 4/2003 | Iisaka et al. | 382/104 |
| 6,577,334 B1 * | 6/2003 | Kawai et al. | 348/148 |
| 6,829,388 B1 * | 12/2004 | Sakurai | 382/199 |
| 2004/0150857 A1 * | 8/2004 | Sawada | 358/2.1 |
| 2004/0216761 A1 * | 11/2004 | Cobley et al. | 134/1 |

* cited by examiner

SMEAR EDGE CANDIDATE
POINT DETECTION REGION 35

SMEAR EDGE VERIFICATION REGION 34
EDGE ACCUMULATED VALUE

APPARATUS AND METHOD FOR DETECTING ROAD WHITE LINE FOR AUTOMOTIVE VEHICLE

BACKGROUND OF THE INVENTION

1. Field of the Invention

The present invention relates to a road white line detecting apparatus and method using a CCD (Charge Coupled Device) camera and, more particularly, relates to road white line detecting apparatus and method which are capable of accurately detecting a position of the white line without an erroneous detection of edges of a smear developed on the CCD camera as the road white line.

2. Description of the Related Art

Recently, in order to achieve an automatic drive of an automotive vehicle or in order to assist a vehicular driver's driving of the vehicle, a video image outputted from a camera mounted on a vehicle is processed to detect such a white line as described above or to extract an image of a preceding vehicle running ahead of the vehicle (so-called, a host vehicle) from the image outputted from the camera. However, although it is ideal that a luminance state is stable during such an image processing as described above, such a stable luminance cannot always be achieved depending upon a usage environment.

For example, while the road white line is detected using the CCD camera mounted on a vehicle body, a strong light source is present within a photograph range due to a presence of a light source itself, such as the sun and a headlight from an opposing vehicle which is running toward the vehicle at an opposing lane adjacent to the traffic lane of the host vehicle and due to reflections of light beams on a surrounding construction (building) and some of other vehicles. Consequently, such a smear phenomenon that white rays of light are extended from the strong light source occurs in a charge transfer direction of the CCD camera.

There is a high possibility that an erroneous detection of the white line occurs since the smear on the photographed image has the similar feature as the white line while a detection of white line is carried out. This provides a problem in a vehicular system having a traffic lane missing alarm system or lane keep assistance function. Hence, an automotive industry has demanded that the road white line should accurately be detected without a mistake that the smear edge is the white line.

A Japanese Patent Application First Publication No. Heisei 9-190537 published on Jun. 2, 1998 exemplifies a previously proposed on-vehicle road white line detecting apparatus.

In the previously proposed road white line detecting apparatus disclosed in the above-described Japanese Patent Application First Publication, such a fact that the smear is developed due to a saturation of a charge in the CCD camera and a pixel value thereof is nearer to a saturation level than that of the white line is utilized. Then, the previously proposed road white line detecting apparatus determines the presence of the white line only when the pixel value of the line edge is strong and the pixel value on the white line is smaller than a predetermined threshold value.

SUMMARY OF THE INVENTION

However, since the previously proposed road white line detecting apparatus determines the presence of the white line under such a condition determination that the pixel value is smaller than the predetermined threshold value, the real white line is erroneously determined as the smear and cannot be detected in such a scene that shadows of ceiling and building are present on the road surface from which the smear occurs or in such a scene of a large brightness difference that shadows and sunlight spots are mixed in a photograph range such an inlet or outlet of a tunnel.

It is, hence, an object of the present invention, to provide white line detecting apparatus and method which are capable of accurately detecting a road white line position without such an erroneous detection that a smear edge developed on the CCD camera is the white line.

According to one aspect of the present invention, there is provided a road white line detecting apparatus (11), comprising: a CCD camera (13) to photograph a road surface; an edge image generating section (17, S10) that generates an edge image from a road surface image photographed and outputted by the CCD camera; a smear edge detecting section (19, S20 through S100) that detects edge positions of a smear from a region of the generated edge image which is determined on the basis of a previously detected position of a white line on the road surface; a smear edge eliminating section (21, S110) that eliminates smear edges corresponding to the edge positions of the smear from the generated edge image; and a white line detecting section (23, S120) that detects the present position of the white line from the generated edge image from which the smear edges have been eliminated.

According to another aspect of the present invention, there is provided a road white line detecting method, comprising: providing a CCD camera (13) to photograph a road surface; generating an edge image from a road surface image photographed and outputted by the CCD camera; detecting (17, S10) edge positions of a smear from a region of the generated edge image which is determined on the basis of a previously detected position of a white line on the road surface; eliminating (21, S110) smear edges corresponding to the edge positions of the smear from the generated edge image; and detecting (23, S120) the present position of the white line from the generated edge image from which the smear edges have been eliminated.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Figure 1:
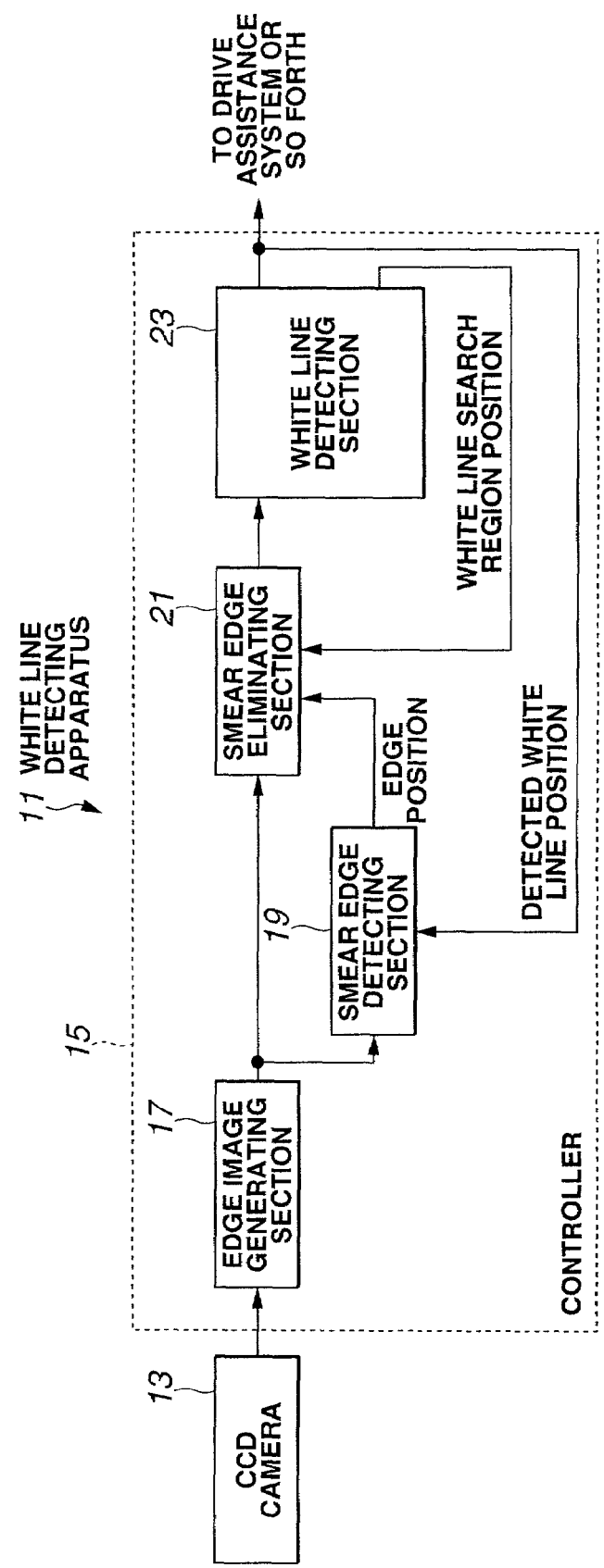
FIG. 1 is a schematic block diagram of a white line detecting apparatus in a preferred embodiment according to the present invention.

FIG. 1 shows a schematic block diagram of a white line detecting apparatus 11 in a preferred embodiment according to the present invention.

In FIG. 1, a CCD (Charge Coupled Device) camera 13 is mounted on a predetermined position within a passenger compartment so as to enable a photographing of an image along a vehicular forward direction. An image photographed by CCD camera 13 is outputted to an edge image generating section 17. The image photographed by CCD camera 13 has its two-dimensional coordinate system with a left uppermost corner as an origin, a positive direction of Y axis being a lowered direction from the origin and a positive direction of X axis being a rightward direction from the origin. A charge transfer direction of CCD camera 13 is assumed to be the positive direction of the Y axis on the image.

Figure 2:
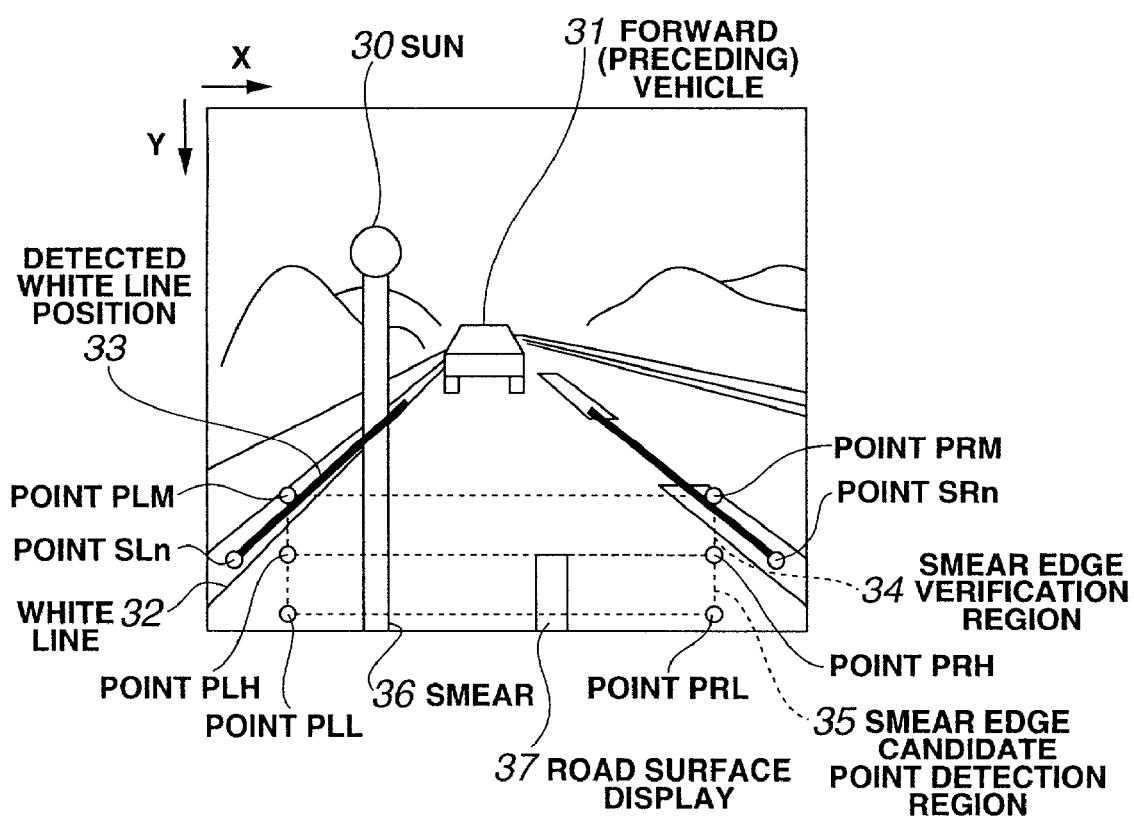
FIG. 2 is an example of a photographed image for explaining a processing region in a photographed image carried out in the white line detecting apparatus shown in FIG. 1.

If such a high light intensity source such as the sun is present, such an image as shown in FIG. 2 is generated. That is to say, a smear such that white rays are superposed from the sun (the light source) on the image of a road surface in the charge transfer direction (Y axis direction) of CCD camera 13 is developed.

A controller 15 includes, in terms of hardware, a CPU (Central Processing Unit) (or MircoProcessor Unit) to govern the whole apparatus thereof in accordance with a control program; a ROM (Read Only Memory) to store the control program; and a RAM (Random Access Memory) to temporarily store control data. Software modules execute an edge detecting process, a smear edge detecting process, a smear edge eliminating process, and a white line detecting process in accordance with the control program. It is noted that such execution contents as described above may be achieved by the hardware.

Hereinafter, processing contents of each section of controller 15 will be described in details.

An edge image generating section 17 inputs the image from CCD camera 13 and detects longitudinal edges and lateral edges from the input image by an edge detection process such as a well known Sobel filter.

A smear edge detecting section 19 detects a smear edge developed according to a high brightness light source from the edge in a region determined on the basis of a previously detected white line position.

A smear edge eliminating section 21 eliminates smear edges corresponding to edge positions of the smear detected by smear edge detecting section 19 from the edge image generated by edge image generating section 17.

A white line detecting section 23 derives a displacement by comparing present white line edge positions to a two-dimensional road model which is an coordinate transformation carried out from a three-dimensional road model using a camera posture parameter and estimates the white line positions and a posture of the photograph device by a method of updating the road model on the basis of the derived displacement.

Figure 3:
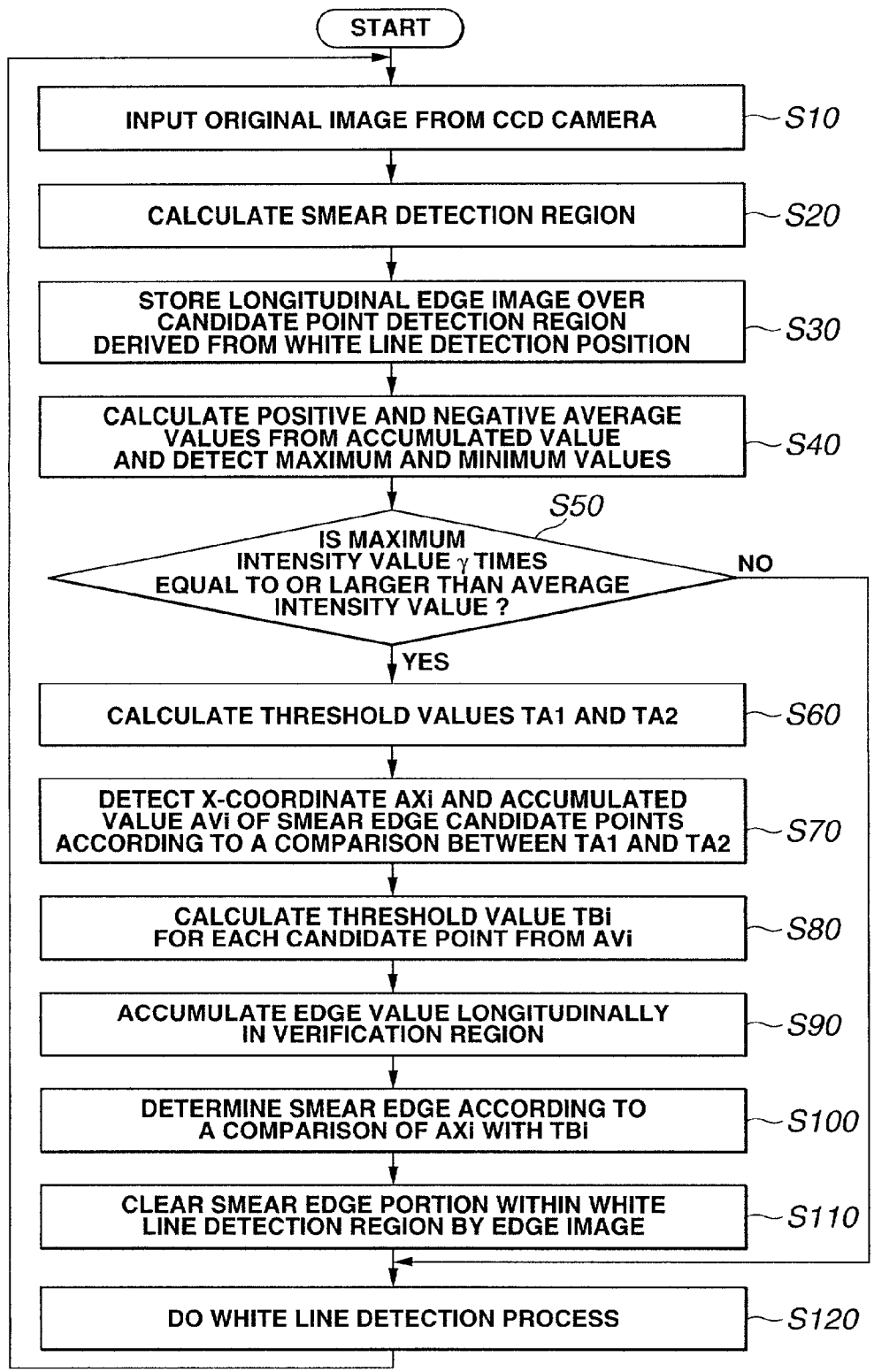
FIG. 3 is an operational flowchart for explaining an operation of the white line detecting apparatus shown in FIG. 1.

Next, an operation of the white line detecting apparatus in the preferred embodiment will be described with reference to a flowchart shown in FIG. 3.

At a step S10, edge image generating section 17 detects longitudinal and lateral edges from the inputted image supplied from CCD camera 13. Consequently, the smear edges are extended in a longitudinal direction within the edge image, as shown in FIG. 2.

At a step S20, the coordinate calculation is carried out on the two adjacent regions of smear edge candidate point detection region 35 and smear edge verification region 34 as a calculation of coordinates of the edge image region to detect the smear.

Figure 4:
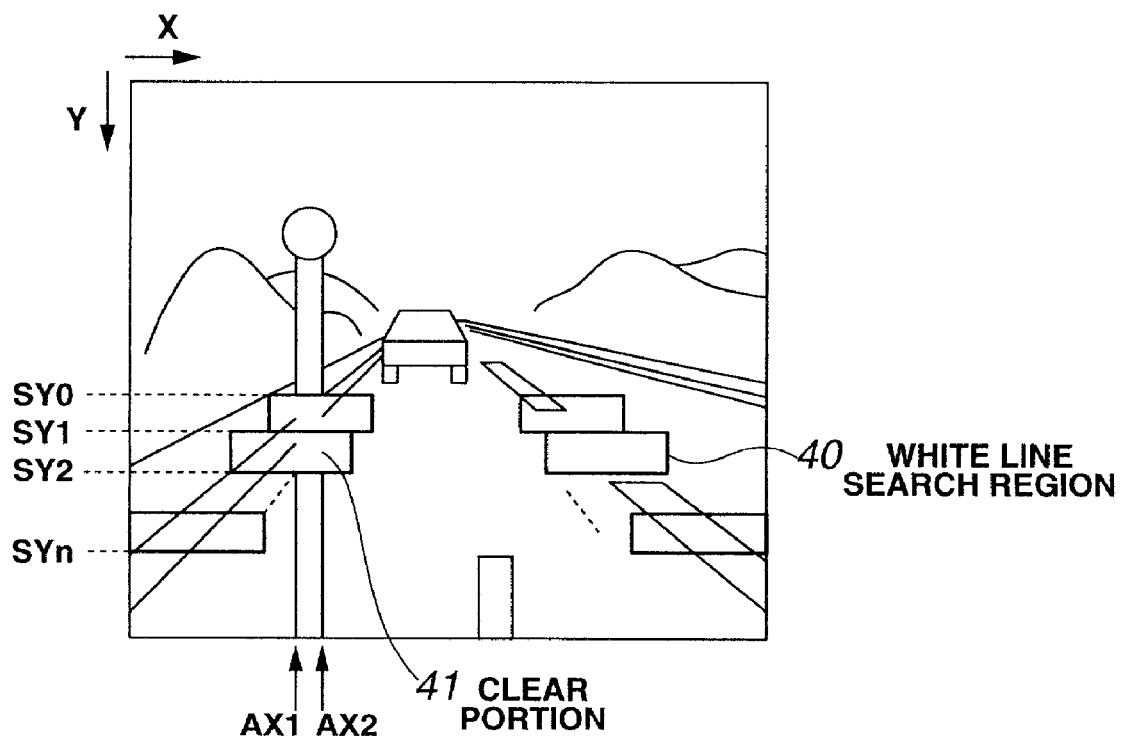
FIG. 4 is an example of the photographed image processed under an image processing carried out in the white line detecting apparatus shown in FIG. 1.

With reference to FIG. 4, a process of detecting the position of the white line will be described below.

The white line detection process is carried out on rectangular white line search regions 40, as shown in FIG. 4.

The white line position is represented as an X-axis coordinate value in a vertical Y-axis coordinate value in respective search regions.

Suppose that a Y-axis coordinate of a lower side in a $_K$-th white line search region 40 is $SY_k$ and the detected white line position is a left side ($SLX_k$, $SY_k$) and a right side ($SRX_k$, $SY_k$). The number of white line search regions 40 are n at its left side and at its right side, respectively, and Y coordinates of the left and right search regions are the same. A lowest point of the detected white line position is set as left side SLn (SLXn, SYn) and as right side SRn (SRXn, SYn). It is noted that a lowest point of the detected white line position 33 in an actual space is expressed, for example, as about 10 meters ahead of the vehicle and a lower side of the photographed image is expressed as about 6 meters ahead of the vehicle.

A smear edge candidate detection region 35 is a rectangular region having a total of four vertexes of two points, viz., PLH (LXn+Xoff, SYn) and PRH (RXn−Xoff, SYn) which are offset in X-axis coordinate direction to two points SLn (SLXn, SYn) and SRn (SRXn, SYn) representing lowest points of the white line position detection process and remaining two points PLL(LXn+Xoff, SYn+DY) and PRL (RXn+Xoff, SYn+DY) moved in the Y-axis direction by DY from the above-described points, as shown in FIG. 2.

Xoff is provided for the white line not to be included in smear edge candidate detection region 35 and has a length of, for example, approximately 10 pixels.

DY is a length from the detected white line position to the lower side of the image screen and, for example, of about 20 pixels.

A smear edge verification region 34 is a rectangular region having four vertexes of the two points PLH (LXn+Xoff, SYn−DY) and RPM (RXn+Xoff, SYn−DY).

The above-described two regions are inside left and right white line edges located at both sides of the road surface immediately before the vehicle and regions which are not easy for the forward (preceding) vehicle running ahead of the vehicle or a surrounding building to be photographed and where are less in nose invasion during the detection of a white line position.

Especially, since the smear edge candidate detection region 35 does not include the white line, the white line is not erroneously detected as the smear.

Referring back to FIG. 3, the smear candidate detection process is executed at steps S30 through S110.

Figure 5A:
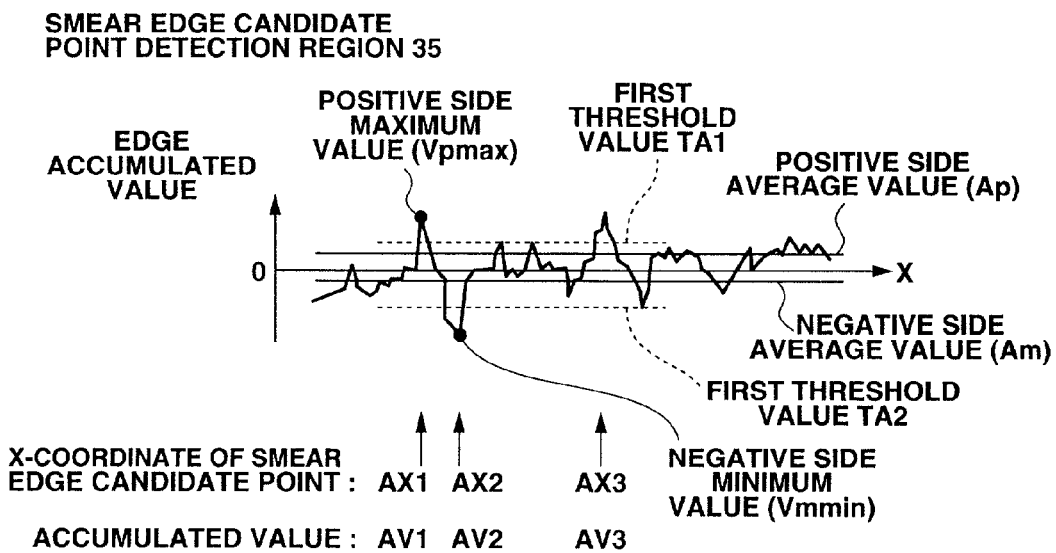
FIGS. 5A and 5B are timing charts for explaining a detection of edge accumulated values carried out in the white line detecting apparatus.

At step S30, Y-axis positive directional accumulated values of longitudinal edges with respect to each X-axis coordinate are derived within the rectangular regions on the longitudinal edge image. The accumulated values indicate large extreme values at portions having longitudinal edges such as the smear and displayed road surface, as shown in FIG. 5A.

At a step S40, a positive maximum value Vpmax of each of the accumulated values with respect to the respective X-axis coordinate values, a negative minimum value thereof Vmmin, and positive and negative average values thereof Ap and Am are derived within the rectangular regions on the longitudinal edge image.

Since, in the longitudinal edge image, a left side edge of a high pixel (gray level) value region on an original image is positive and aright-side edge thereof is negative, each accumulated value also indicates positive or negative value. For the positive value, a maximum value Vpmax and average value Ap in term of edge intensity are derived. Then, as far as the negative value is concerned, minimum value Vmmin and average value Am are derived.

At a step S50, controller 15 determines that the smear occurs in a case where maximum value Vpmax of the light intensity in the positive side is equal to or larger than positive average value Ap by a constant magnification value γ or in a case where the minimum value Vmmin of the negative side is equal to or smaller than negative average value Am by constant magnification value γ. The constant magnification value, for example, γ=20. Otherwise, controller 15 determines that no smear occurs and the routine goes to a step S120 at which a white line detection process is executed.

In a case where the smear occurs (Yes at step S50), the routine goes to step S60, their respective threshold values TA1 and TA2 at positive and negative sides are derived using the following equations (1) and (2) on the basis of positive and negative maximum and minimum values of Vpmax and Vmmin and average values Ap and Am at step S40.

$$TA1 = \alpha * (Vp\max + Ap) \quad (1)$$

$$TA2 = \alpha * (Vm\min + Am) \quad (2)$$

In the equations (1) and (2), α denotes a value to separate an average value derived due to a convex and recess of the road surface from the extreme values caused by the smear edges and is determined so that first threshold values TA1 and TA2 can be interposed into a numerical value between a road surface edge intensity and a smear edge intensity. For example, α=0.5.

At step S70, at smear candidate detection region 35, the coordinate values of the positive extreme values which are equal to or larger than positive first threshold value TA1 and the corresponding positive accumulated values and those of the negative extreme values which are equal to or smaller (negatively larger) than negative first threshold value TA2 and the corresponding negative accumulated values are determined as X-axis coordinate values AXi and their corresponding accumulated value AVi.

In the case of FIG. 5A, X-axis coordinate values AX1, AX2, and AX3 of the extreme values of smear edge candidate points and corresponding accumulated values AV1, AV2, and AV3 are determined.

At step S80, threshold value TBi respectively corresponding to individual accumulated value AVi for each smear edge candidate point is calculated in accordance with an equation (3).

$$TBi = \beta * AVi \quad (3)$$

It is noted that β is derived on the basis of a statistical value of a ratio between the accumulated values in smear edge candidate detection region 35 in the smear edge intensity and the accumulated values in the smear edge verification region 34 and is, for example, β=0.5.

At step S90, controller 15 derives a Y-axis directional accumulated value BVi, for X-axis coordinate AXi of smear edge candidate points in the same manner as step S30 within the smear edge verification region 34 in the same way as derived at step S20.

At step S100, controller 15 compares second threshold value TBi derived at step S80 with the Y-axis directional accumulated value BVi derived at step S90 within the smear verification region 34 and detects X-axis coordinate AXi as smear edge coordinate values.

Figure 5B:
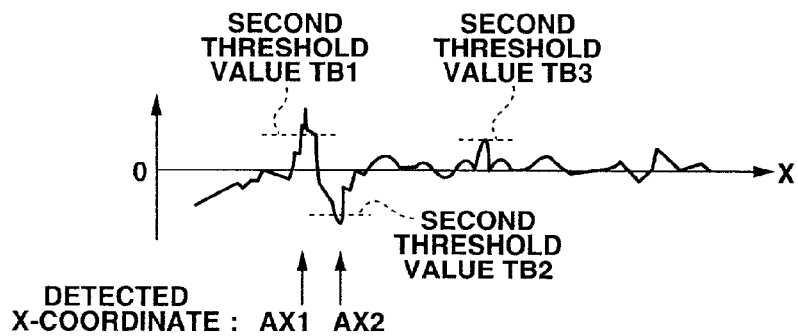

In FIG. 5B, AX1 and AX2 are detected as smear edge coordinate values having the accumulated values equal to or larger than second threshold values of TB1 and TB2.

Firstly, in the case of smear diving the influence on the white line detection, vertical edges are detected on both regions of smear edge candidate detection region 35 and smear edge verification region 34. However, since, in the case of the displayed road surface, no such a long vertical straight line display on the photographed image is present between both areas, such a possibility as the erroneous detection of the road surface display can be reduced.

Secondly, since each of the first threshold values is set between each average value of the corresponding accumulated value and each corresponding maximum (minimum) value, a part having a relatively strong edge intensity is detected, the influence on the white line edges due to a remarkable road surface convex and recess can be reduced.

Thirdly, since threshold values during the smear edge verification are calculated from the accumulated value at the same coordinate value as smear candidate detection region 35, the smear developed uniformly over the respective regions can selectively be detected.

Fourthly, since the accumulated value can be taken only for the candidate in the smear verification region 34, the processing time can be reduced.

Referring back to FIG. 3, at a step S110, the smear edge coordinate detected as described above falls within the white line search region 40 on the white line detection process. In FIG. 4, if Y-axis coordinate in the rectangular region representing white line search region 40 of the k-th number white line region from the top white line search region is $SY_{k-1}$, $SY_k$, a value of "0" is written into a rectangular region with (AXi−DX, $SY_{k-1}$) and (AXi+DX, $SY_k$) as the corresponding vertexes. It is noted that, for example, DX is determined to clear the part present in the smear edge having the strong intensity of DX. The processing time can be shortened by clearing only white line search region 40.

At step S120, the white line detection is carried out from longitudinal and lateral edge image. The method of detecting the white line detection from the longitudinal and lateral edge image is exemplified by a Japanese Patent Application First Publication No. Heisei 9-190537 published on Jul. 22, 1997. That is to say, basically, the displacement is derived by comparing the present white line edge position with two-dimensional coordinate transformed road model using a camera posture parameter from the three-dimensional road model and the white line position and a posture of the photographing device (CCD camera 13) are estimated by updating the road model on the basis of the displacement to estimate the white line position and posture of the photographing device.

Since the smear edge is eliminated from the process of the step S110, the white line can be detected from the image photographed by CCD camera 13 without the erroneous detection of the white line positions, the white line can be detected from the image photographed by CCD camera 13.

In addition, in this method, since the road model has been used, the stable estimation can be carried out even if the white line edge portions are not derived for the whole white line search region 40, the white line position can stably be estimated even if the smear edge portion is partially overlapped over the white line edge and is cleared.

As described above, since the series of processes at steps S10 through S120 are repeated, the influence of the smear on the photographed image by CCD camera 13 in which the smear is developed can be reduced so that the white line of road can highly be detected with a high reliability.

As described above, the edge image is generated from the image photographed by CCD camera 13 and the edge position of the smear is detected from the edge image at the region determined on the basis of the white line positions previously detected. Furthermore, the smear edges corresponding to the edge positions of the smear are detected from the generated edge image and the white line position is detected from the edge image from which the smear edges have been eliminated. Hence, the white line positions can be detected without erroneous detection of the smear edges as the white lines and this can contribute to an improvement in detection accuracy of a white line.

In addition, since the smear edge candidate points are detected with the detection region set in the other region than that included in the detection region of the smear edge candidate points and the position of smear edge point within the smear edge verification region is verified on the basis of the coordinate values of the detected smear edge candidate points in the smear edge verification region which abuts the smear edge candidate point detection region of smear edge candidate points and which has been translated in parallel in the reverse direction to the transfer direction of the charge of CCD camera 13, the detection accuracy of the smear edge can be improved. Consequently, the white line positions can be detected without the erroneous detection of the smear edges as the white line.

Furthermore, when the edge positions of the smear is included in the white line search region during the detection of white line, the smear edge in the internal of white line search region (40) is eliminated so that the processing time related to the elimination of smear edge can be shortened.

Still furthermore, the first threshold value is calculated on the basis of the extreme value and average value on the edge accumulated values in the charge direction as CCD camera within the detection region of the smear edge candidate point. The coordinate of the extreme value of the edge accumulated value exceeding the first threshold value and the edge accumulated value is detected as the smear edge candidate point. Then, the second threshold value for the respectively corresponding to the edge accumulated values of the smear edge candidate points are calculated.

If the edge accumulated value in the verification region for the smear edge candidate point is larger than the second threshold value, the coordinate of the edge accumulated value is detected as the smear edge position. Hence, the detection accuracy of the smear edge can be improved. Consequently, the white line position can be detected without erroneous detection of the smear edge as the white line.

The entire contents of a Japanese Patent Application No. 2000-356565 (filed in Japan on Nov. 22, 2000) are herein incorporated by reference. Although the invention has been described above by reference to certain embodiment of the invention, the invention is not limited to the embodiments described above. Modifications and variations of the embodiments described above will occur to those skilled in the art in the light of the above teachings. The scope of the invention is defined with reference to the following claims.

What is claimed is:

1. A road white line detecting apparatus, comprising:
 a CCD camera to photograph a road surface;
 an edge image generating section that generates an edge image from a road surface image photographed and outputted by the CCD camera;
 a smear edge detecting section that detects edge positions of a smear from a region of the generated edge image which is determined on the basis of a previously detected position of a white line on the road surface;
 a smear edge eliminating section that eliminates smear edges corresponding to the edge positions of the smear from the generated edge image; and
 a white line detecting section that detects the present position of the white line from the generated edge image from which the smear edges have been eliminated.

2. A road white line detecting apparatus as claimed in claim 1, wherein the smear edge detecting section comprises: a smear edge candidate point detecting section that sets a smear edge candidate point detection region on a region of the generated edge image in which the previously detected position of the white line is absent to detect smear edge candidate points from the set smear edge candidate point detection region; and a smear edge verification section that sets a smear edge verification region which abuts the smear edge candidate point detection region and which is parallel translated from the smear edge candidate point detection region in a reverse direction to a charge transfer direction of the CCD camera to verify the positions of the smear edges at which smear edge points are located within the set smear edge verification region on the basis of coordinates of the detected smear edge candidate points.

3. A road white line detecting apparatus as claimed in claim 1, wherein the smear edge detecting section eliminates the smear edges from an internal of a white line search region into which the white line position detection section searches the present position of the white line when the detected positions of the smear edges by the smear edge detecting section is included in the white line search region.

4. A road white line detecting apparatus as claimed in claim 2, wherein the smear edge candidate point detecting section comprises: a first threshold value calculating section that calculates a first threshold value to determine the smear edge candidate points on the basis of extreme values on edge accumulated values and average values thereon in the charge transfer direction of the CCD camera within the smear candidate point detection region; and a coordinate detecting section that detects coordinates of the extreme values of the edge accumulated values and the edge accumulated values at the extreme values which are equal to or larger than the first threshold value, the detected coordinates thereof being coordinates of the smear edge candidate points, and wherein the smear edge verification section comprises: a second threshold value calculating section that calculates second threshold values to determine the smear edge respectively corresponding to the edge accumulated values of the smear edge candidate points; and a smear edge position detecting section that detects the positions of the smear edges from the coordinates of the edge accumulated values with respect to the smear edge verification region which are equal to or larger than their corresponding second threshold values.

5. A road white line detecting method, comprising:
 providing a CCD camera to photograph a road surface;
 generating an edge image from a road surface image photographed and outputted by the CCD camera;
 detecting edge positions of a smear from a region of the generated edge image which is determined on the basis of a previously detected position of a white line on the road surface;
 eliminating smear edges corresponding to the edge positions of the smear from the generated edge image; and
 detecting the present position of the white line from the generated edge image from which the smear edges have been eliminated.

6. A road white line detecting method as claimed in claim 5, wherein, when detecting the edge positions of the smear, setting a smear edge candidate point detection region on a region of the generated edge image in which the previously detected position of the white line is absent to detect smear edge candidate points from the set smear edge candidate point detection region and setting a smear edge verification region which abuts the smear edge candidate point detection region and which is parallel translated from the smear edge candidate point detection region in a reverse direction to a charge transfer direction of the CCD camera to verify the positions of the smear edges at which smear edge points are located within the set smear edge verification region on the basis of coordinates of the detected smear edge candidate points.

7. A road white line detecting method as claimed in claim 5, wherein, when eliminating the smear edges from the generated edge image, eliminating the smear edges from an internal of a white line search region into which the present position of the white line is searched when the detected positions of the smear edges is included in the white line search region.

8. A road white line detecting method as claimed in claim 6, wherein, when detecting the smear edge candidate points, calculating a first threshold value to determine the smear edge candidate points on the basis of extreme values on edge accumulated values and average values thereon in the charge transfer direction of the CCD camera within the smear candidate point detection region and detecting coordinates of the extreme values of the edge accumulated values and the edge accumulated values at the extreme values which are in excess of the first threshold value, the detected coordinates thereof being coordinates of the smear edge candidate points, and wherein, when setting the smear edge verification region, calculating second threshold values to determine the smear edge respectively corresponding to the edge accumulated values of the smear edge candidate points and detecting the positions of the smear edges from the coordinates of the edge accumulated values with respect to the smear edge verification region which are in excess of their corresponding second threshold values.

9. A road white line detecting method as claimed in claim 8, wherein the CCD camera is disposed to photograph the road surface in a vehicular forward direction, wherein the smear edge candidate point detection region is a rectangular region having four vertexes of PLH (LXn+Xoff, SYn), PRH (RXn−Xoff, SYn+DY), PLL (LXn+Xoff, SYn+DY), and PRL (RXn+Xoff. SYn+DY), wherein Xoff denotes an X-axis directional offset value from a lowest point of left and right previously detected white line positions expressed as SLn (SLXn, SYn) and SRn (SRXn, SYn) and DY denotes a movement distance in a Y-axis negative direction from the two vertexes of PLH and PRH, denotes the number of white line search regions, X-axis positive direction being vertical to a Y-axis positive direction which is coincident with the charge transfer direction of the CCD camera, and the smear edge candidate point verification region has four vertexes of PLH (LXn+Xoff, SYn), PRH (RXn−Xoff, SYn), PLM (LXn+Xoff, SYn−DY), and PRM (RXn+Xoff, SYn −DY), wherein the edge accumulated values are derived for respective X-axis positive coordinate values within the smear edge candidate point detection region, a positive maximum value (Vpmax), a negative minimum value (Vmmin), a positive average value (Ap), and a negative average value (Am) for the respective edge accumulated values are derived, first threshold values (TA1 and TA2) for the positive and negative accumulated values are calculated as follows: TA1=$\alpha$* (Vmmax+Ap) and TA2=$\alpha$*(Vmmin+Am), wherein $\alpha$ denotes a first predetermined value for the respective first threshold values TA1 and TA2 to be interposed between a road surface edge intensity and a smear edge intensity, and the X-axis coordinate values (AXi) of positive extreme values of the edge accumulated values which are equal to or positively larger than the positive first threshold value (TA1) and those of the negative extreme values of the edge accumulated values (AXi) which are equal to or negatively larger than the negative first threshold value (TA2) are derived and the accumulated values (AVi) corresponding to the extreme values which are equal to or positively or negatively larger than the positive or negative first threshold value (TA1 or TA2) are derived, wherein the second threshold value (TBi) corresponding to the individual edge accumulated values are calculated in the smear edge verification region as follows: TBi =$\beta$*AVi, wherein $\beta$ denotes a second predetermined value based on a statistical value of a ratio between the edge accumulated values in the smear edge candidate point detection region and those in the smear edge verification region, and wherein the accumulated value (Bi) in the Y-axis positive direction is derived for the X-axis positive coordinate values (AXi) of the smear edge candidate points within the smear edge verification region and when any accumulated values (Bi) are equal to or larger than the second threshold value (TBi), the corresponding X-axis coordinate values (AXi) are detected as the coordinate values of the smear edge positions.

10. A road white line detecting method as claimed in claim 9, wherein when the X-axis coordinates (AXi) of the detected smear edge is present within one of the white line search regions, a value of "0" is written into a part of the white search region which has diagonal vertexes expressed as (AXi−DX, $SY_{k-1}$) and (AXi+DX, $SY_k$), wherein k denotes an order number of the white line search regions and Y-axis coordinate values of the k-th number of the white line search regions are expressed as $SY_{k-1}$ and $SY_k$.

11. A road white line detecting apparatus, comprising:
  photographing means having a CCD camera to photograph a road surface;
  edge image generating means for generating an edge image from a road surface image photographed and outputted by the CCD camera;
  smear edge detecting means for detecting edge positions of a smear from a region of the generated edge image which is determined on the basis of a previously detected position of a white line on the road surface;
  smear edge eliminating means for eliminating smear edges corresponding to the edge positions of the smear from the generated edge image; and
  white line detecting means for detecting the present position of the white line from the generated edge image from which the smear edges have been eliminated.

* * * * *